Nov. 27, 1928.

C. A. GUTERRES

ELECTRIC MOTOR

Filed Dec. 29, 1926

Inventor
Carlos A. Guterres
by Hazard and Miller
Attorneys.

Nov. 27, 1928.  
C. A. GUTERRES  
ELECTRIC MOTOR  
Filed Dec. 29, 1926

Inventor  
Carlos A Guterres  
by Hazard and Miller  
Attorneys.

Patented Nov. 27, 1928.

1,693,294

UNITED STATES PATENT OFFICE.

CARLOS A. GUTERRES, OF SANTA MONICA, CALIFORNIA, ASSIGNOR OF ONE-THIRD TO ERNEST F. IVERSON, OF LOS ANGELES, CALIFORNIA, AND ONE-THIRD TO DALE M. GINGRAS, OF SANTA MONICA, CALIFORNIA.

ELECTRIC MOTOR.

Application filed December 29, 1926. Serial No. 157,691.

My invention relates to an improved multipolar electromagnetic motor, constructed with two sets of field poles secured on the two end pieces of the casing and an armature rotatably mounted on the shaft and between the two sets of field poles.

An object of my invention is the construction of a motor having two sets of field poles placed one set on each side of an armature in the direction of the axis of the armature shaft and having preferably one more field pole in each set than the number of armature poles.

The polarity of the armature poles is changed one at a time. The advantage of this will be fully explained later.

In constructing my motor I preferably utilize a suitable frame and if the motor is made with two sets of field poles with six poles to each set, these are evenly spaced in a circle and the two sets of field poles being separated longitudinally of the motor and the armature having five poles is rotatably mounted on the shaft with the outer faces fitting between the two sets of field poles. This construction gives armature poles having a long radius compared to the diameter of the casing and field poles, and thus allows exertion of greater torque on the armature shaft and gives a greater fly wheel effect on the armature.

The construction and function of my motor and the various features thereof will be more apparent from the description and drawings in which:

Figs. 4, 5, 6 and 8 are merely to show the relative positions of the field poles, armature, commutator and brushes more clearly and are not intended to, and do not, show the actual positions occupied by these parts. The actual respective positions are as shown in Figs. 1, 2 and 3.

Figure 1:
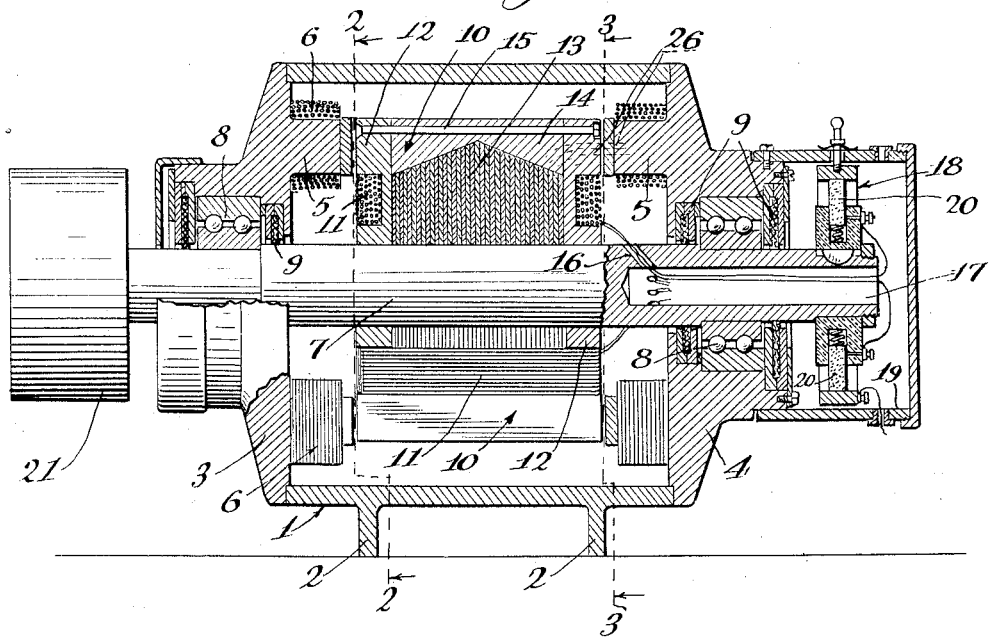
Figure 1 is a longitudinal section through a motor constructed in accordance with my invention.
Figure 2:
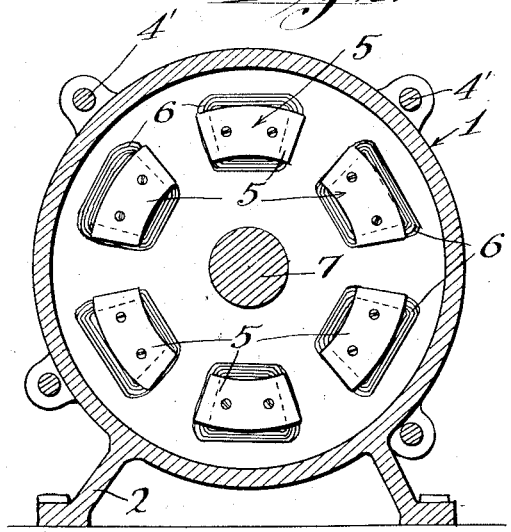
Fig. 2 is a transverse section on the line 2—2 of Fig. 1 in the direction of the arrows showing one of the sets of the field poles.
Figure 3:
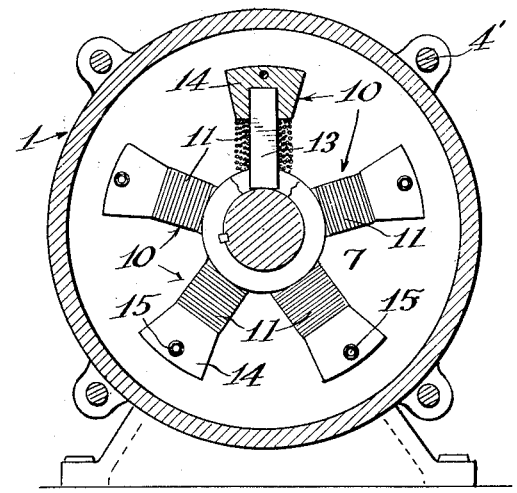
Fig. 3 is a transverse section on the line 3—3 of Fig. 1 showing the armature poles.

Referring first to illustrations, in Figs. 1, 2 and 3 the motor casing is designated by the numeral 1 and is preferably cylindrical, being mounted on suitable legs 2. The casing is provided with end pieces 3 and 4 joined together by bolts 4', these having a series of field pole pieces 5 constructed thereon. These pole pieces project toward each other longitudinally of the motor and in the construction shown I indicate six poles for each set. These poles have suitable windings 6, the poles of each set being wound in series and the two sets again in series. The poles in each set are wound to have alternately north and south poles, and the poles of the two sets facing each other are of the same polarity.

The armature shaft 7 is indicated as being mounted on any suitable anti-friction bearings or the like 8, these bearings being protected by felts or the like 9 to hold the grease, and having a series of armature pole pieces 10. These pole pieces are shown as being five in number and extend radially from the shaft and have windings 11 around each of the pole pieces.

I prefer to construct the armature poles of end sections 12 and a series of laminated plates 13, the laminations being radial and transverse to the shaft. Cap pieces 14 are on the outside of the laminations, the whole being together by bolts 15. The lead to the armature windings may pass through openings 16 in the armature shaft and lead through the hollow end 17 of the shaft. The commutator 18 is mounted on the extension 19 from the end pieces 4 and is shiftable a short distance in a circular direction. The brushes 20 are connected to the shaft, bearing against the commutator. A drive from the motor may be obtained by means of a pulley 21, or the like.

Figure 4:
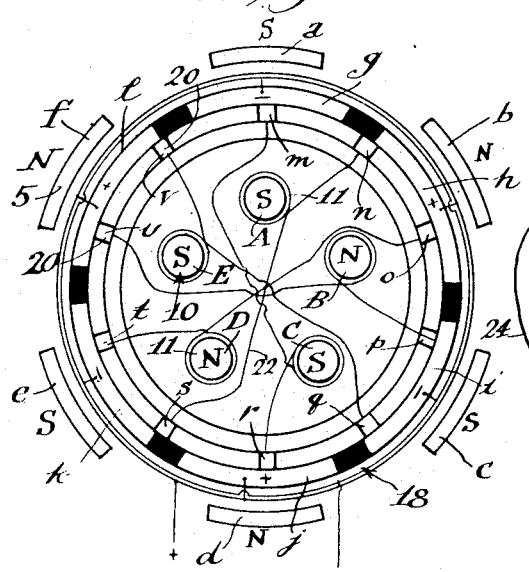
Fig. 4 is a diagram illustrating the relative position of the field poles, the commutator, the brushes and a certain position of the brushes and armature poles while the motor is operating at normal speed.
Figure 5:
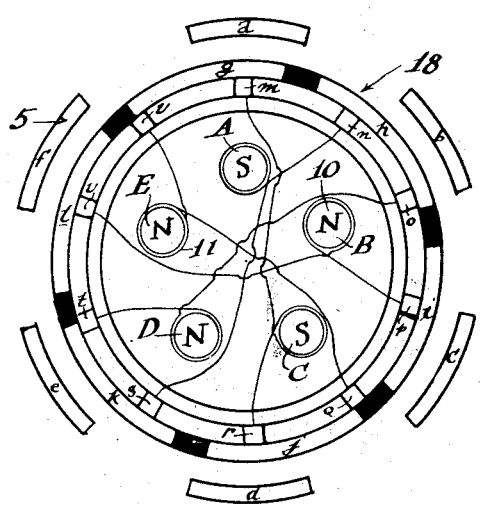
Fig. 5 is a diagram similiar to Fig. 4 showing the relative position when the commutator is advanced relative to the field poles.
Figure 6:
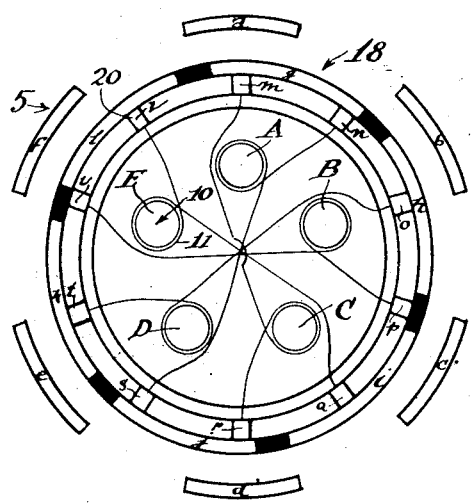
Fig. 6 is a diagram similar to Fig. 4 with the commutator retarded in relation to the field poles.

Referring to the diagrammatic drawings of the Figs. 4, 5 and 6, the field poles are designated $a$, $b$, $c$, $d$, $e$ and $f$. The various commutator segments are designated by the letters $g$, $h$, $i$, $j$, $k$ and $l$. These are so spaced and insulated that at no time will anyone of the brushes short circuit them. The brushes are designated by the letters $m$, $n$, $o$, $p$, $q$, $r$, $s$, $t$, $u$ and $v$. The armature poles are designated by the letters A, B, C, D, and E.

Figure 7:
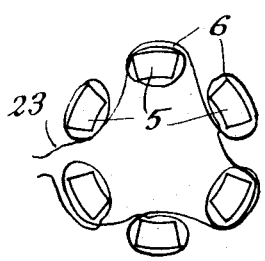
Fig. 7 is a diagram indicating the winding of the field poles to obtain opposite polarity of the adjacent poles.

The opposite brushes are connected by lead wires 22, these wires being connected to the armature winding 11 of each armature pole so that, for instance, the brush $m$ is connected to the opposite brush $r$ through the armature pole C (Fig. 6). The brushes $n$ and $s$ are connected through the armature pole A (Fig. 6). The brushes $o$ and $t$ through the armature pole D (Fig. 6). The brushes $p$ and $u$ through the armature pole B (Fig. 6), and the brushes $q$ and $v$ are connected through the armature pole E (Fig. 6). The leads 23 (Fig. 7) connect the field pole windings 6 so that the windings on adjacent poles, considered circumferentially are of opposite polarity.

Figure 8:
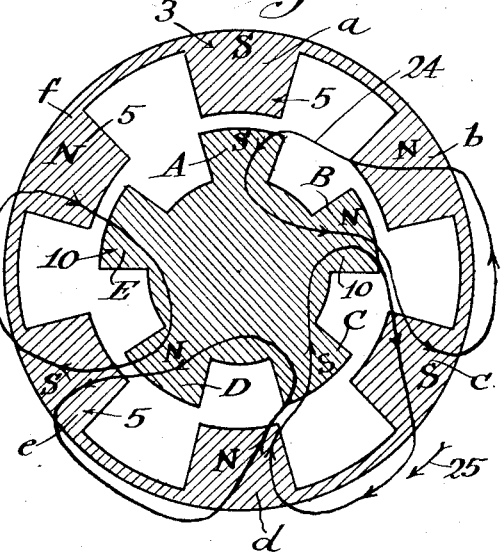
Fig. 8 is a diagram showing the magnetic relation of the field and armature poles.

In the drawings Figures 4, 5 and 8 the letters N and S, referring to the field poles, indicate their respective polarity and the similar letters on the armature poles in the different diagrams represent the polarity of such poles at a particular instant in their rotation.

In Fig. 8 the magnetic flux are indicated diagrammatically by the paths 24 at the instant when the armature poles are in the position as shown in Fig. 4. It will be seen that the field poles $a$ and armature poles A are of the same polarity and as they are directly opposite each other, they repel each other. The armature pole A is attracted by the north field pole $b$.

The north armature pole B is repelled by north field pole $b$ and attracted by south field pole $c$ and so on around the circle, the direction of the rotation of the armature being in a clockwise direction and indicated by the arrow 25. The magnetic lines of flux 24 follow a path indicated roughly by the dotted lines 26 (Fig. 1).

As the armature windings 11 are not only located closer to the shaft than the field pole faces, and out of the field magnetic flux, but are also at right angles to the field windings, no counter electro motor force will be induced in the armature windings during the revolutions of the armature, because the wire of the armature windings does not cut the field magnetic flux.

Referring to Figs. 4, 5 and 6, it will be seen that when the commutator is advanced, that is, shifted in a counter clockwise direction from the position shown in Fig. 4 (see Fig. 5) that the relative time of magnetizing the armature poles is changed. For instance, if the armature poles are considered as in the position shown in Fig. 4 the pole E is changed from South to North Pole. The action of shifting the commutator in a counter clockwise direction increases the speed of the motor. If the commutator is retarded, that is, shifted in a clockwise direction, in reference to that of Fig. 4 (see Fig. 6), the motor is slowed down, and on sufficient shifting of the commutator, may be reversed in the direction of rotation.

It will be understood that the armature poles and field poles may be wound in any suitable relative manner, for instance, the field poles may be wound in series and in shunt with the armature poles or any other winding which will be suitable to the arrangement of the various poles. By my construction of the armature poles, the eddy currents are materially reduced in that the end sections 12 and the cap pieces 14 do not give continuous metal to carry eddy currents and these currents are broken up by the laminations 13; such construction, however, allows an easy path for the magnetic lines of force which pass in a longitudinal direction from the opposite pole pieces towards or from the outside periphery of the armature pole pieces, and thence radially through the laminations towards the shaft and either in or out of the adjacent armature pole piece to the next field pole pieces on each side, considered circumferentially.

As the armature poles are substantially constantly saturated, the density of magneic. flux is affected very little by the magnetic induction of the field poles which they are approaching, thereby reducing the self induced E. M. F. in the armature windings caused by changing density of the magnetic flux and which tends to retard the flow of forced current.

It is of special advantage to have an odd number of pole pieces on the armature in relation to those in the field as in this way the field poles act on the armature poles with a slightly different degree, and as the armature windings are connected to the outside feeders in parallel, this allows reversal of current in the armature windings to take place only one at a time. As there are twice as many brushes as there are armature windings, that is, ten brushes for five armature poles operating on a commutator of six segments which is relatively stationary, only one pair of brushes changes place on the commutator segments at a time, thereby reversing the current in the armature winding connected to that pair of brushes.

A special advantage of this type of motor is claimed when building larger motors, as it permits an armature of larger diameter without increasing the length of armature. Also when an armature of large diameter is used, more field poles and more armature poles could be used to advantage.

It will be seen from the above mechanical description of the construction of the motor that I have developed a motor which is comparatively simple to construct and which is easily repaired if necessary. The magnetic fields are such that there is little loss compared with the general type of motors and the motor may operate with an economical consumption of current for the power developed.

Various changes may be made in the principles of my invention without departing from the spirit thereof, as set forth in the description, drawings and claims.

I claim:

1. An electric motor comprising in combination a fixed structure having an armature shaft rotatably mounted therein, a plurality of armature poles arranged radially with windings on radial cores, two sets of a plurality of field poles secured to the fixed structure, the two sets of field poles being spaced apart and extending towards each other and having winding thereon, the armature poles being rotatably mounted on the shaft between the two sets of field poles.

2. An electric motor as claimed in claim 1, the winding on the armature poles terminating inside in a radial direction to the position of the field poles and having the armature pole pieces extending to substantially the outer circumference of the field poles.

3. An electric motor comprising in combination a motor casing with opposite end pieces, an armature shaft journaled in the end pieces, a plurality of armature poles having iron cores extending radially from the shaft and having windings on the core with opposite iron faces exposed adjacent to the outer ends of the said poles and two sets of a plurality of field poles mounted on the end pieces facing towards each other parallel to the shaft and having windings thereon, said field poles having iron cores, the field poles, cores and the exposed face of the armature pole being contiguous, the armature poles being rotatable between the two sets of field poles.

4. An electric motor comprising a fixed structure having an armature shaft journaled therein, with a plurality of radially positioned armature poles having windings and radial cores, and two sets of a plurality of equally spaced field poles, their being one more field pole in each set of field poles than the number of armature poles.

5. An electric motor comprising in combination a casing having end pieces, an armature shaft rotatably mounted in the end pieces, a plurality of armature poles having radially extending cores with windings on the cores and exposed magnetizable metal extending radially beyond the windings, and two sets of a plurality of field poles, one more pole in each set than the number of armature poles, said field poles being mounted on the end pieces and extending towards each other parallel to the shaft and having windings on said poles, the armature poles being rotatable between the said two sets of field poles, the magnetizable metal of the armature poles being contiguous to the field poles.

6. An electric motor having a plurality of equally spaced field poles, a plurality of rotatable armature poles, one less in number than the field poles, a commutator having an equal number of segments to the field poles, and a plurality of brushes operating with the armature poles, being double the number of said armature poles, the opposite brushes being electrically connected and each of the connections forming part of the windings on the armature poles.

7. An electric motor comprising in combination two sets of a plurality of equally spaced field poles, the poles of two sets of field poles facing each other having the same polarity and adjacent poles in a circumferential direction being of opposite polarity, a plurality of commutator segments separated by insulation, said segments equaling in number the poles on one set of field poles, a plurality of brushes double the number of the armature poles bearing on the commutator, opposite brushes having a connecting electric lead, each of the said leads being connected to the winding of one of the armature poles, and means to shift the commutator with relation to the brushes.

8. An electric motor having two sets of a plurality of field poles arranged in a circle, the two sets being spaced apart longitudinally, the poles of the two sets facing each other being of the same polarity and adjacent poles in each set in a circumferential direction being alternately of opposite polarity, an armature having a plurality of poles, one less in number than the field poles in one set of field poles and rotatable between the two sets of field poles, and means to change the polarity of the armature poles one at a time during its rotation.

9. An electric motor comprising in combination a fixed structure having two sets of a plurality of field poles spaced apart longitudinally facing each other, windings on each pole, the two poles facing each other being of the same polarity and adjacent poles in each set considered circumferentially being alternately of opposite polarity, a plurality of brushes equal in number to the field poles in each set, a rotatable armature having a plurality of armature poles extending radially and operative between the two sets of field poles, windings on said armature poles, said poles being one less in number than the field poles in each set, and a plurality of commutator segments double the number of armature poles.

In testimony whereof I have signed my name to this specification.

CARLOS A. GUTERRES.

CERTIFICATE OF CORRECTION.

Patent No. 1,693,294.  Granted November 27, 1928, to

CARLOS A. GUTERRES.

It is hereby certified that the name of the first mentioned assignee in the above numbered patent should have been written and printed "Ernest T. Iverson", instead of "Ernest F. Iverson", as shown by the records of assignments in this office; and that the said Letters Patent should be read with this correction there in that the same may conform to the record of the case in the Patent Office.

Signed and sealed this 20th day of May, A. D. 1930.

M. J. Moore,
Acting Commissioner of Patents.

(Seal)